June 3, 1969

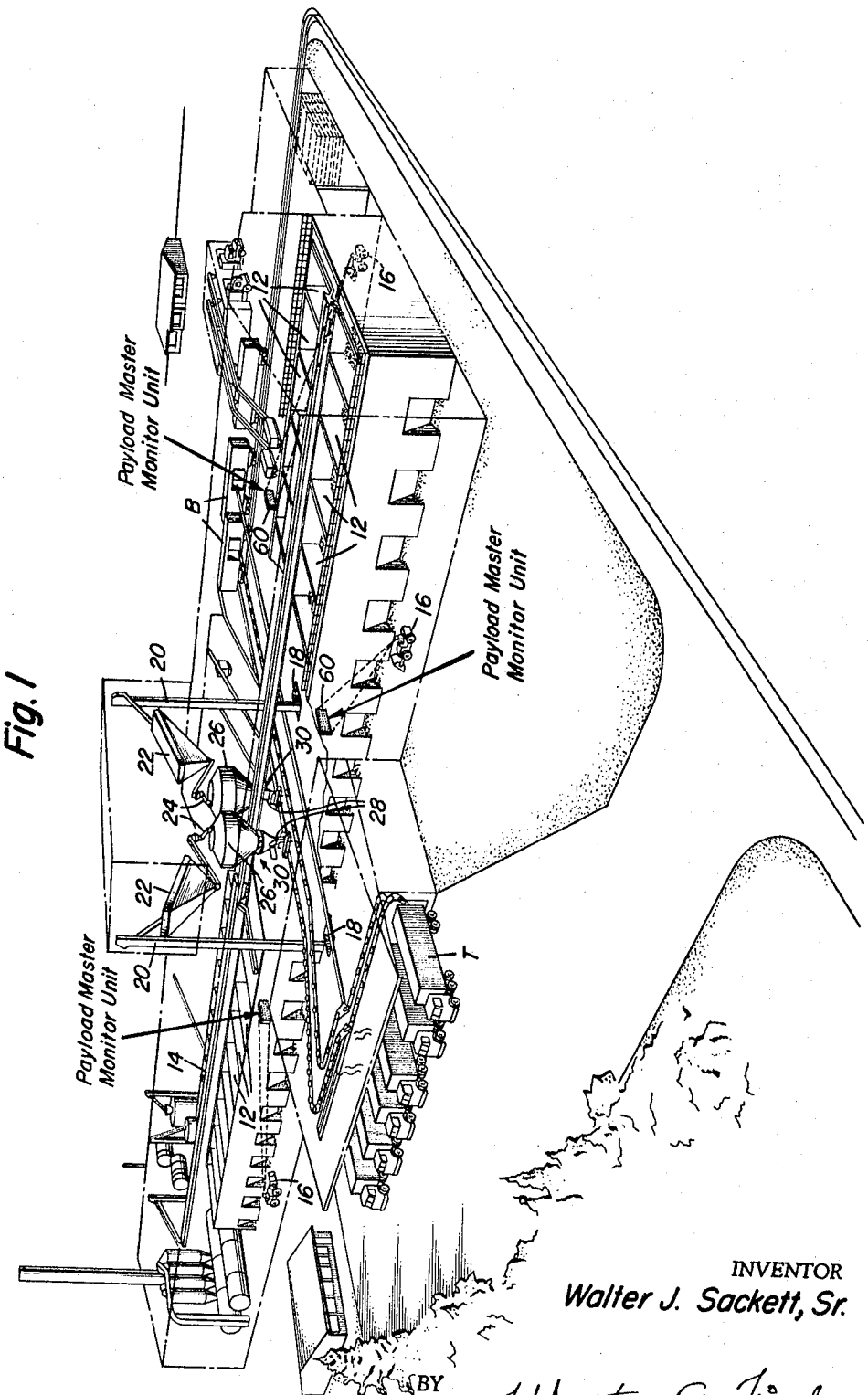

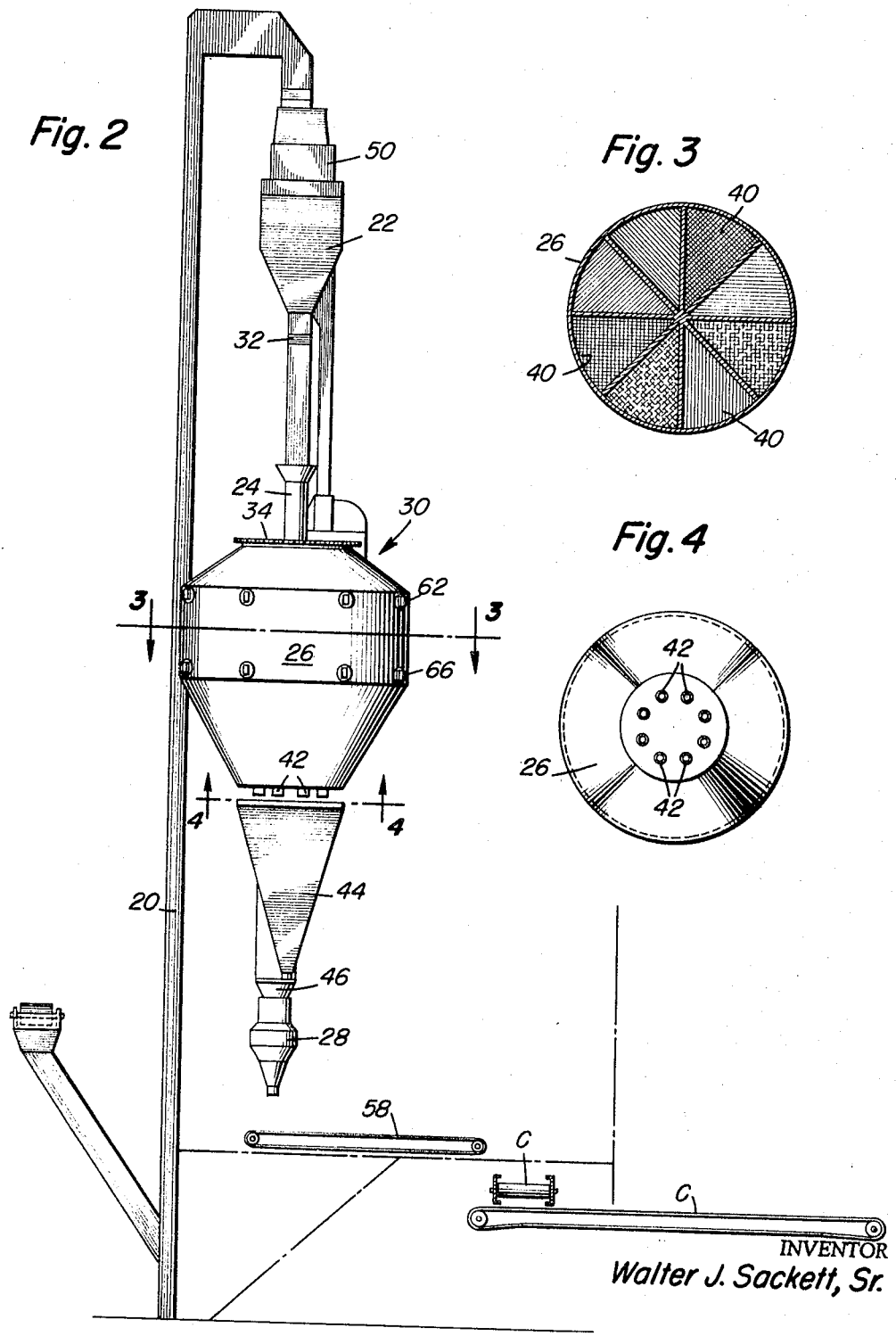

W. J. SACKETT, SR 3,447,698

HIGH SPEED SELECTIVE PACKAGING SYSTEM

Filed Dec. 20, 1965

INVENTOR

Walter J. Sackett, Sr.

BY Walter G. Finch

ATTORNEY

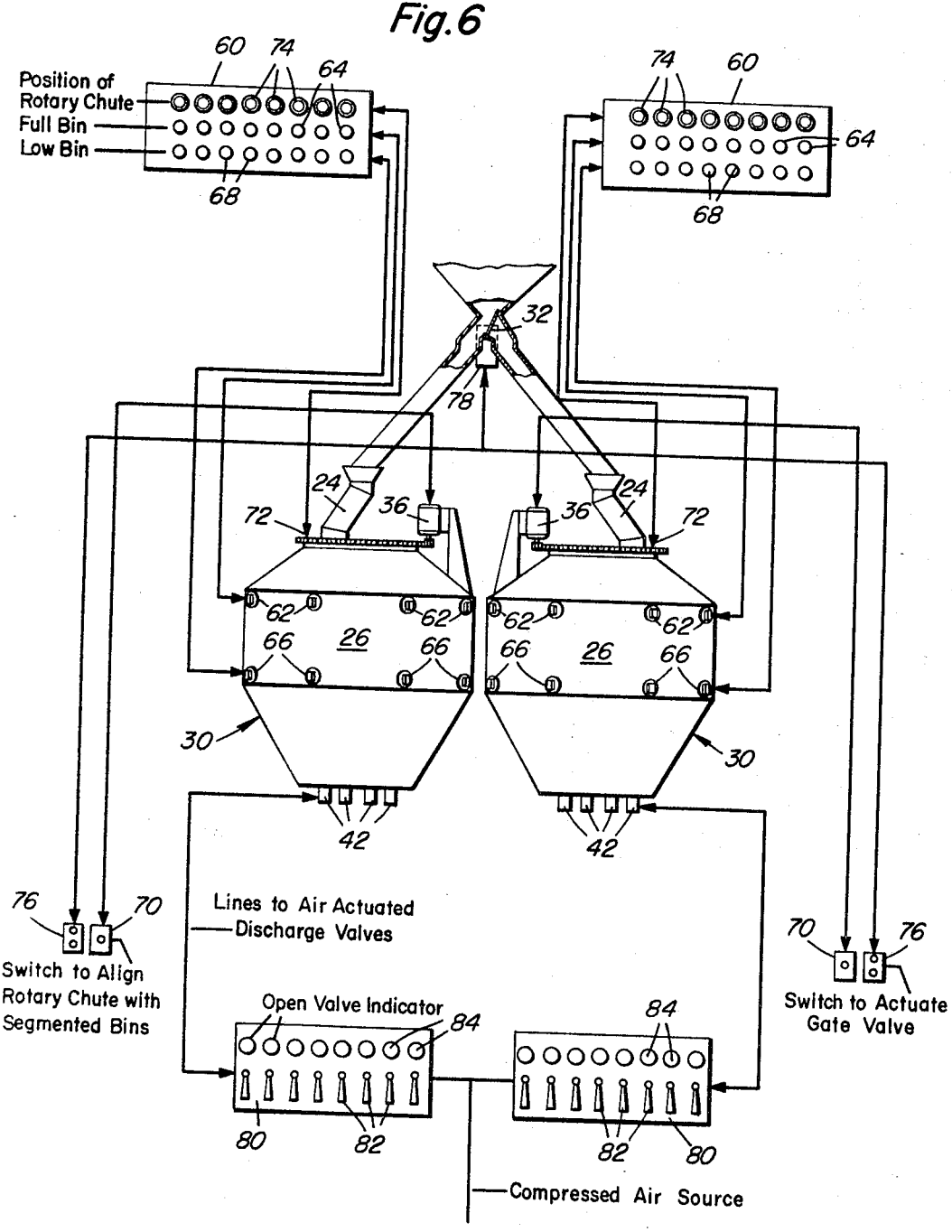

United States Patent Office 3,447,698
Patented June 3, 1969

3,447,698
HIGH SPEED SELECTIVE PACKAGING SYSTEM
Walter J. Sackett, Sr., Baltimore, Md., assignor to The A. J. Sackett & Sons Company, Baltimore, Md., a corporation of Maryland
Filed Dec. 20, 1965, Ser. No. 514,937
Int. Cl. B65g 65/74, 11/12
U.S. Cl. 214—16        3 Claims

ABSTRACT OF THE DISCLOSURE

Granular material is selectively dispensed from a charging hopper into a pair of chutes, each of which communicates to a rotary spout, each of which, in turn communicates selectively with compartments in a pair of hoppers, thereby enabling each compartment of each hopper to be charged with the granular material desired from the single charging hopper. Each compartment is provided with a discharge gate, and a collecting hopper bridges all the discharge gates for collecting the granular material for weighing purposes. A swingable conveyor is provided to receive granular material discharged from the collecting hopper and delivering such material to another conveyor which recycles the material to the charging hopper.

---

This invention relates generally to packaging plants, and more particularly it pertains to a storage dispensing system for rapid change of material for dispensing and/or packaging and delivery.

In the past, customers of a plant encountered considerable delay and confusion in the filling of on the spot orders for various compounded materials such as different formulas of mixed feeds, fertilizers and other such customized materials.

It is an object of this invention to provide an arrangement of a dispensing plant where rapid change of the dispensed product can be accomplished.

Another object of this invention is to provide an arrangement of apparatus for multiple choice dispensing of materials which can operate continuously in charge and discharge cycles which are completely independent.

Yet another object of this invention is to provide a rotating spout for charging the compartments of a multiple compartment hopper.

Still another object of this invention is to provide a monitor system for a dispensing plant which will indicate remotely the charging and discharging conditions of the apparatus for most efficient continuous operation of the plant.

To provide a material collecting arrangement for multiple product dispensing which can be quickly and completely purged of one product before the introduction of another, is a further object of this invention.

Other objects and attendant advantages of this invention will become more readily apparent and understood from the following detailed specification and accompanying drawings in which:

FIG. 1 is a general perspective view of a multiple product high speed packaging plant incorporating features of this invention;

FIG. 2 is an end elevation of a novel dispersing hopper arrangement for the plant of FIG. 1;

FIG. 3 is a detailed cross sectional view of the multiple compartment hopper taken on line 3—3 of FIG. 2;

FIG. 4 is a bottom view of the same hopper taken on line 4—4 of FIG. 2;

FIG. 6 is a schematic diagram showing the monitor system for efficiently operating the packaging plant.

Figure 5:
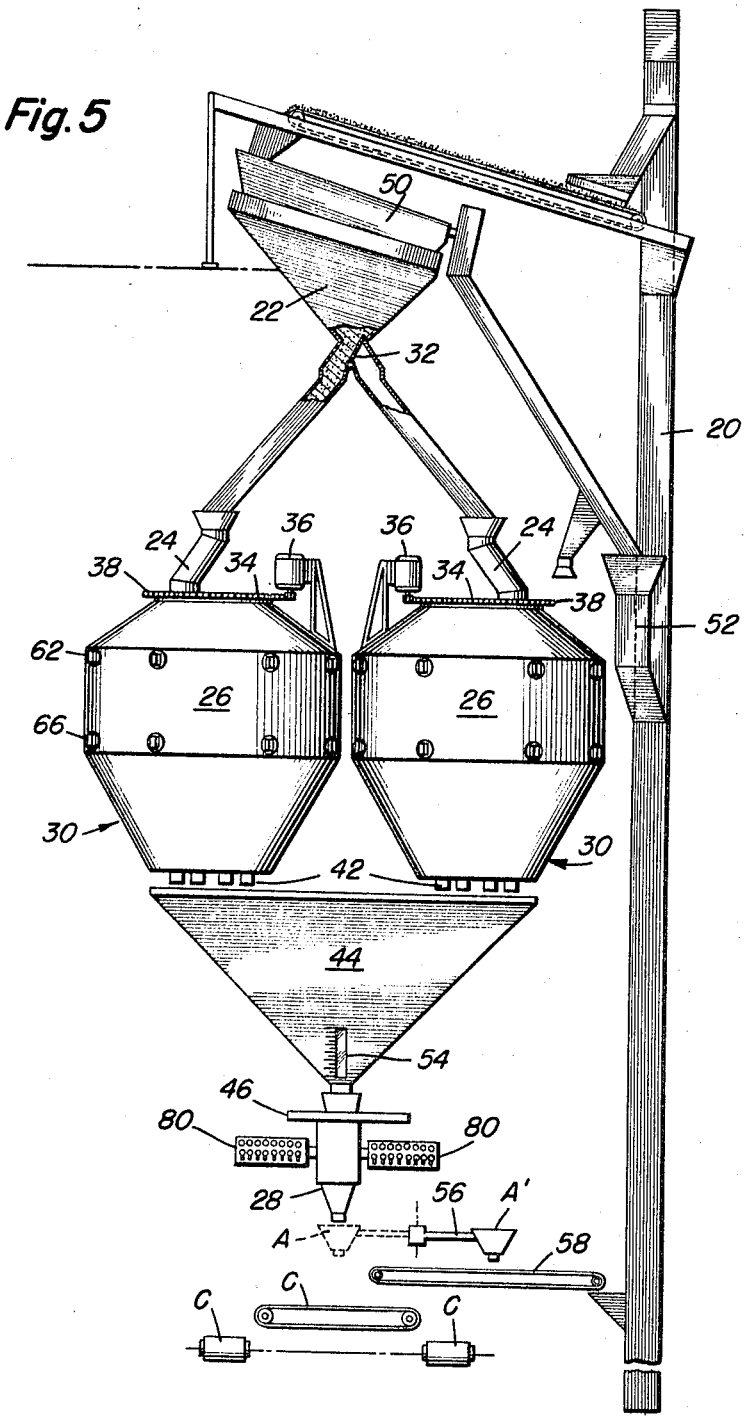
FIG. 5 is a side elevation of the dispensing hopper arrangement.

Referring now to FIG. 1 of the drawings there is shown generally a diversified material storage and dispensing plant. This plant consists of a plurality of storage bins 12 arranged for overhead charging with various differing materials from a traveling conveyor 14. As required, material is manually chosen from these bins 12 and conveyed by loader trucks 16 to charging pits 18 of elevators 20.

The elevators 20 raise the material and dump it into overhead vibrating screens 50 and hoppers 22. A rotary discharge spout 24 then charges multiple compartment hoppers 26 of a material handler magazine assembly 30 where the material is held in limited amounts until chosen and metered out to bagging machines 28. Reversible conveyors C then deliver the bagged material to box cars B or trucks T for ultimate disposition. If desired, the material can be dispensed by spouts from machines 28 in an unbagged bulk state, in the required amounts, directly by conveyor C to box cars, trucks, as indicated, so that a plurality of materials, in bulk state and properly separated from each other can be stored in each vehicle, truck, railroad car, for further distribution.

The rapidity of choice from the plurality of materials available and almost instant bagging or direct disbursement in bulk state and delivery thereof is due in large part to the magazine assemblies 30. These magazine assemblies 30 may be used singly or in pairs. In the latter case a pneumatically operated directional gate 32 is attached to the bottom of the charging hopper 22 as shown in FIGS. 2 and 5 to direct the flow of material into either one of the two rotary discharge spouts 24.

The discharge spout 24 is mounted on a large centrally pivoted cover plate 34 of the multiple compartment hopper 26 of each magazine assembly 30 and arranged to be positioned by a motor 36 geared to teeth 38 on the periphery of the plate 34. In this manner, the spout 24 may be positioned to charge any of the compartments 40 best shown in FIG. 3.

Each compartment 40 has a pneumatically controlled discharge valve 42 at the bottom of the hopper 26. A collecting hopper 44 is positioned under the valves 42 and it directs material released therefrom into a weigh hopper 46 and thence to the bagging machines 28, or directly by conveyor C, in an unbagged state, to waiting trucks, vans, or railroad car as desired.

To avoid clogging the compartment discharge valves 42, the material is screened as shown best in FIG. 5, before introduction to the charging hopper 22 and the oversize material is broken up in a disintegrator 52 and returned by the elevator 20 to the charging hopper 22. FIG. 5 shows a modification of the FIG. 1 arrangement in that a single charging hopper 22 feeds two multiple compartment hoppers.

A glass sight gauge 54 in the lower portion of the collecting hopper 44 indicates to the operator any remainder of material chosen for bagging after an order is filled. By means of a swinging hopper 56 in position A, having a closure gate on the bottom, such excess material can be drained from the collecting hopper 44 through the weighing hopper 46 and bagging machine 28 and deposited in position A' on a conveyer 58 for return by elevator 20 to its proper compartment 40.

In the event it is desired to dispense bulk materials directly to waiting trucks, vans, railroad cars, and the like, the desired material for example, say 8000 pounds, is dispensed into hopper 44, which amount represents a certain level on the sight gauge 54. Any over estimate of material dispensed into hopper 44 can readily be determined by visual observation and weighing. Any excess of material chosen for direct dispensing in bulk state after an order is filled can be returned as previously indicated.

A system of light signals and controls is used in efficiently operating the equipument. As shown in FIGS. 1 and 6 payload master monitor units 60 are mounted at elevated points within sight of the operators of the loader trucks 16. High level sensers 62 on the side of compartments 40 of the multiple compartment hopper 26 show full conditions on lights 64. Low level sensers 66 and lights 68 similarly indicate when a compartment 40 needs replenishment.

An operator has access to a switch 70 for operating the spout positioning motor 36. A position senser 72 connected to a light 74 on the master monitor 60 orders the operator of a loader truck to recharge the appropriate compartment 40 connected with the spout 24. The operator of the motor control switch 70 also has control of the directional gate 32 by means of a control switch 76 wired to a penumatic cylinder 78 which operates the gate 32 so as to direct the charging to the desired magazine assembly 30.

The bagging operator has available a control panel 80 for compartment discharge valves 42. He is thus able to select and open the proper valves 42 with air control levers 82 as required by the order of the customer for material of a centain kind. A signal light 84 on the panel 80 reports the opening of such valve 42.

What is claimed is:

1. In a system for storing and dispersing granular material, comprising a charging hopper for said granular material, a multiple compartmented hopper having its compartments radially arranged, a rotary spout for receiving the discharge of said granuar material from said charging hopper and directing said discharge to the compartment desired of said multiple compartmented hopper, and means receiving the discharge from said multiple compartmented hopper and directing it to the destination desired, the improvement comprising: a second of said multiple hopper and a second of said rotary spout and gate means for directing the discharge of said granular material from said charging hopper to the rotary spout desired, discharge means including a separate discharge gate for each said compartment and a hopper for combining the discharge of all said multiple compartmented hoppers, each said multiple compartmented hopper having low and high level sensors for each said compartment and a position indicator for each said rotary spout; a master monitor, including an array of level indicators respectively actuated in response to sensing of low levels by said respective low level sensors, a corresponding array of level indicators respectively actuated in response to sensing of high levels by said respective high level sensors, the said rotary spout position indicator including an array of indicators respectively coresponding to all said level indicators; whereby the said system is adapted by said gate, second multiple hopper, and master monitor for continuous discharge, one said multiple hopper being discharge while the other said hopper is being refilled to order of the said rotary spout indicator and corresponding level indicators.

2. In a system for storing and dispensing granular material, comprising a charging hopper for said granular material, a multiple compartmented hopper having its compartments radially arranged, a rotary spout for receiving the discharge of said granular material from said charging hopper and directing said discharge to the compartment desired of said multiple compartmented hopper, and means receiving the discharge from said multiple compartmented hopper and directing it to the destination desired, the improvement comprising: means returning any excess of said discharge from said multiple compartmented hopper thereto, said means including a swingable hopper for receiving said excess of said discharge and swinging to another location and a conveyor for receiving said excess of said discharge from said swingable hopper in said another location and returning said excess of said discharge to said multiple compartmented hopper.

3. The system as recited in claim 2 wherein the discharge from said multiple compartmented hopper defines a path and said swingable hopper is swingable into said path for receiving said excess of said discharge and swingable out of said path for discharging onto said conveyor.

References Cited

UNITED STATES PATENTS

| 525,232 | 8/1894 | Reese et al. | 222—157 |
|---|---|---|---|
| 1,413,505 | 4/1922 | Stump | 193—23 |
| 2,381,505 | 8/1945 | Lindholm | 214—17 X |
| 3,095,097 | 6/1963 | Mellow | 214—17 X |
| 3,189,197 | 6/1965 | Sackett | 214—16 |
| 3,255,857 | 6/1966 | Armstrong et al. | 193—23 |
| 1,418,738 | 6/1922 | Robb. | |

ROBERT G. SHERIDAN, *Primary Examiner.*

U.S. Cl. X.R.

193—23; 214—2